Patented Oct. 4, 1927.

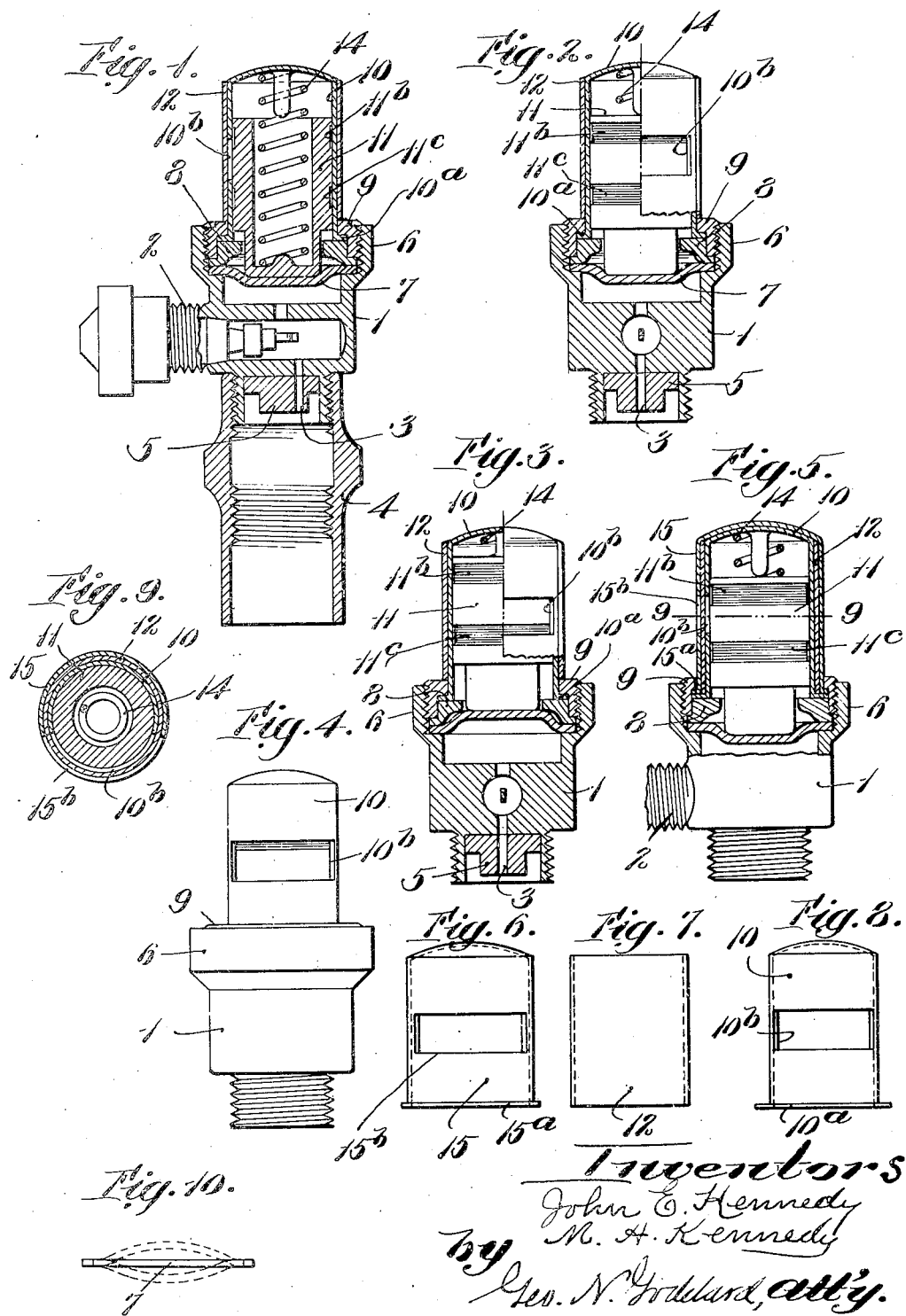

1,644,193

UNITED STATES PATENT OFFICE.

JOHN E. KENNEDY AND MICHAEL A. KENNEDY, OF LOS ANGELES, CALIFORNIA.

VISUAL DEFLATION SIGNAL FOR TIRES.

Application filed July 13, 1925, Serial No. 43,082. Renewed February 15, 1927.

This invention relates to automatic deflation signals for pneumatic tires, and is intended to provide a device for permanent attachment to the stems of tires which will give warning of deflation or over-inflation by a danger signal that is visible without close reading or inspection.

Heretofore it has been proposed to apply devices for this purpose to automobile tires, but such devices require the reading of a fine scale and consequently such close and careful inspection of each tire indicator that the public have not been disposed to make substantial use of them.

At the present time there is an increasing use of balloon tires in the use of which it is very important that the tire should be neither under-inflated nor over-inflated. If over-inflated no special benefit is derived from the use of the balloon tire, while if under-inflated there is danger of injury to the tire. The present device is intended to meet this situation by providing a device adapted for permanent attachment to the valve stem of the tire and having but a limited range of movement, but so constructed that when the standard or normal inflation for a given tire is reached the device displays no warning signal but immediately upon a fall of the pressure below the normal or standard inflation, a very conspicuous signal is exposed to view that can be easily read at a distance. On the other hand over-inflation of the tire is made conspicuously apparent by the exposure of a conspicuous signal indicating the over-inflation of the tire. Provision is made also for positively excluding all dust and water from working parts so that the sensitiveness of the device is not affected by the accumulation of dirt on the exterior thereof.

Another feature of the present improvement resides in the use of a neutral flexible diaphragm which both acts as a seal to the air chamber and transmits the air pressure to a movable spring-pressed indicator member without adversely affecting or impairing the perfect balancing of the device through the exertion of its own tension or stretch, this flexible diaphragm being responsive, without resistance, to the counter-balancing movements of the indicator, and if made of rubber is not deteriorated by being kept constantly stretched as in previous devices used for this purpose.

These and other features of the invention will be explained in the following specification and will be defined in the claims hereto annexed.

In the accompanying drawings we have illustrated a device embodying the several features of this invention, in which:

Figure 1 is a longitudinal section through the complete device with its attaching coupling for securing it to the valve stem of the tire.

Figure 2 is a view of the device shown in Figure 1 with the coupling removed taken at right angles to Figure 1, and being partly in elevation and partly in central section.

Figure 3 is a central longitudinal section similar to the section of Figure 2 but showing the diaphragm in raised or position indicative of over-inflation.

Figure 4 is a front elevation of the device with the attaching coupling removed.

Figure 5 is a central longitudinal section showing a slightly modified arrangement.

Figures 6, 7 and 8 are detail views showing the various parts connected with the display of the signal.

Figure 9 is a transverse section on the plane 9—9 of Figure 5.

Figure 10 is a detail view showing the flexible air-sealing diaphragm in normal position before insertion into the interior of the containing air chamber, its bowed form both in over-inflated and under-inflated position being shown in dotted lines.

In the practice of the invention, in the form illustrated, the body 1 contains a hollow compressed air chamber having a valved inlet nipple 2 on one side, and having a passage 3 through an internally projecting boss 5 which, when the device is tightly coupled to the valve stem of the tire by means of the threaded coupling member 4, engages the upper end of the stem of the tire valve and depresses it sufficiently to maintain constant communication between the interior of the tire and the interior air chamber of the body 1.

The body member 1 has its free or inward end, when applied to the tire, somewhat enlarged to form an internally threaded attaching flange 6 which is engaged by a spanner clamping ring 9 which clamps an externally stepped washer or ring 8 firmly against the peripheral boss of a flexible disk 7 forming an air-tight diaphragm which receives the air pressure of the tire and transmits it to a spring-pressed plunger or piston, which also, in this case, serves as the movable indicator to indicate the condition of the air pressure as to over-inflation or under-inflation, as will now be described.

A hollow casing 10, closed at its inward end and provided at its outer or open end with an external flange 10$^a$, is held between an inwardly projecting annular flange of the clamping ring 9 and the adjacent face of the stepped washer 8 so as to be fixed against movement. This hollow casing is provided intermediate of its ends with a lateral opening or window 10$^b$ of predetermined width.

Inside this casing, which forms in reality a piston chamber, is located a movable plunger or piston 11, of hollow or tubular construction whose closed lower end is forced against the opposing disk or diaphragm 7 by means of a helical spring 14 of predetermined strength. The exterior face of said movable pressure indicator is provided with two spaced annular countersunk recesses which are spaced apart a distance corresponding to the width of the window or opening 10$^b$ formed in the peripheral wall of the casing 10. These countersunk bands are coated with red paint or enamel or other conspicuously contrasting substance so as to be clearly visible when either of them is exposed to view through said window, but are normally beyond opposite sides of the window opening when the tire is pumped to the standard normal pressure.

For illustration, suppose that the standard pressure for a certain balloon tire is fixed at 30 pounds. Then the signal device selected for such tire would be one marked 30 pounds in which the piston indicator, when properly attached to the inflated tire, would stand with the two signal bands 11$^b$ and 11$^c$ out of sight on opposite sides of the window 10$^b$, and only the blank space corresponding in appearance to the exterior of the casing 10 would be exposed to view. Should the tire be over-inflated the air pressure will force the piston indicator against the counter-balancing or opposing spring to expose the conspicuous band 11$^c$, through the window 10$^b$. On the other hand, a partial deflation of the tire allows the spring to press the piston indicator toward the diaphragm and thus expose, through the window, the inner band 11$^b$ which indicates under-inflation.

To prevent fine dust or grit mud or water from working into the interior of the device we provide a close-fitting sleeve 12 of thin transparent material, such as gelatine, glass or the like, which may be cemented, if desired, to the piston casing 10, but which will ordinarily remain in place if snugly fitted owing to the fact that the centrifugal force, when the wheel is rotating, tends to throw it toward the rim of the wheel instead of inwardly.

In Figures 5 to 9, inclusive, a construction is provided to protect the transparent sleeve 12 from the scratching action of dirt when the car is traveling over the road. In this case the construction already described is employed but the sleeve 12, instead of being the outer member, is itself covered or surrounded by a very thin shield 15 of metal or other suitable material which is provided with a flange 15$^a$ at its outer end to interlock with the inwardly turned flange of the clamping collar 9, and which is also provided with a window 15$^b$ in registry with the window 10$^b$, already described. This arrangement permits the same easy inspection of the tire indicator at a distance but shields the transparent window closure in large measure from the scratching action of sand and dust. If, in course of time, the transparent sleeve should become scratched where exposed it can be partly rotated to bring a fresh surface opposite the window opening, and thus function without decreased visibility.

Inasmuch as rubber, which is commonly used for air cells, is subject to rapid deterioration when kept stretched, we have provided a diaphragm in the form of a flat disk which is made of larger diameter than the chamber in which it is to be inserted. Consequently, when the disk is pressed to its seat it normally assumes a bowed or cupped position, as indicated in Figures 1 and 2, but without stretching the fabric. At the same time it affords no appreciable resistance of itself to being bowed in the opposite direction when acted upon by the air pressure over-balancing the piston spring. The diaphragm, therefore, is neutral in its action and does not impair the delicate balance that it is desired to maintain between the air pressure in the tire and the pressure of the spring of known strength. The disk may, therefore, be made of rubber without subjecting it to deterioration that is consequent upon keeping the rubber in a stretched condition. This feature of the invention is of much practical importance because where the elasticity or stretch of the diaphragm is an element materially affecting the resistance to the action of the air pressure, it is obvious that the deterioration of the rubber will seriously impair the accuracy of the counter-balance in such case. It will be found that the reversal of position from outwardly bowed to inwardly bowed position will be effected under the opposing air and spring pressures without any sudden jump or weakening which is incident to a diaphragm that is molded in concavo-convex form.

The terms "inner" and "outer" as used herein have reference to the axis of rotation of the wheel or tire, the inner portion of the structure being that nearest the axis or hub of the wheel and the outer portion being that nearest to the tire.

What we claim is:

1. A tire deflation signal device, embracing in its construction a hollow body forming an air chamber adapted to maintain communication with a tire, a piston casing secured to said air chamber, a movable spring-pressed piston arranged therein to oppose a yielding resistance to the air pressure in said chamber to counter-balance the same, said piston being provided with external circumferential conspicuous signal bands spaced apart, said casing being provided with a lateral opening dimensioned and arranged to register with the space between the signal bands when the tire is inflated to normal pressure, and to expose one or the other of said bands to view as the tire pressure falls below or rises above the predetermined normal pressure.

2. In a tire deflation visual signal adapted for permanent attachment to and communication with a pneumatic tire, the combination of a hollow body forming a compressed air chamber in communication with the interior of the tire, a piston casing secured to the open end of said body, an air-sealing and pressure transmitting diaphragm of soft pliable fabric normally opposing no inherent resistance to movement under air pressure, a slidable tubular piston whose closed lower end seats against said diaphragm, a compression spring mounted inside said piston to exert opposite thrust against the bottom thereof and against the inner end of the piston casing, said piston being provided near its inner end with an external band conspicuously visible at a distance in contrast with the exterior of the surrounding casing, the casing being provided with a lateral opening at a distance from its inner end arranged to expose said signal band when the tire is partially deflated below normal pressure, substantially as described.

In witness whereof we have subscribed the above specification.

JOHN E. KENNEDY.
M. A. KENNEDY.